Patented May 14, 1946

2,400,398

UNITED STATES PATENT OFFICE 2,400,398

PYRAZINE

James Kenneth Dixon, Riverside, Conn., assignor to American Cyanamid Company, New York, N. Y., a corporation of Maine No Drawing. Application May 20, 1942, Serial No. 443,703

2 Claims. (Cl. 260—250)

This invention relates to the catalytic dehydrogenation of piperazine.

Pyrazine, as a raw material for the manufacture of aminopyrazines and ultimately sulfanilamidopyrazines, has become of increasing commercial importance, particularly in the field of chemotherapy. Pyrazine itself is a comparatively well-known compound but previous to the present invention has never been made by any process suitable for development on a commercial basis. When produced it has always been on a comparatively small scale, by inefficient processes giving a yield of about 3–6%.

By way of contrast, piperazine, which differs from pyrazine only by the degree of hydrogenation, may be readily prepared by a number of processes. Piperazine itself is available in sufficient quantities to serve as an adequate basis for the development of a practical, commercial process either in a relatively pure form or as a hydrate such as the hexahydrate.

On the basis of availability alone, piperazine appears to be a suitable raw material for the manufacture of pyrazine on a commercial basis. Although pyrazine, $C_4H_4N_2$, differs from piperazine, $C_4H_{10}N_2$, only in its degree of hydrogenation and the dehydrogenation reaction appears to be relatively simple, actually it is very difficult to carry out successfully. The prior art contains no teaching of how this may be done on an economically feasible basis. Not only is the reaction difficult to initiate but a high temperature is necessary and the problem is complicated by the fact that the dehydrogenation from piperazine to pyrazine will not be the only reaction to take place. Under the temperature conditions required, the ring structure would be expected to be cracked with the concurrent formation of side reaction products and ammonia. Therefore the reaction is not only difficult to initiate but when started it is difficult to direct. Under these conditions a catalyzed reaction offers the most likelihood of success but whether cracking or dehydrogenation will be catalyzed is wholly unpredictable. In fact, because of the structure of the pyrazine ring the cracking reaction is the most reasonable to anticipate.

The problem of finding a catalyst suitable for the purpose therefore has for its first consideration the fact that the catalyst must be capable of initiating dehydrogenation. It also must have the minimum possible tendency to promote cracking.

In addition to these requirements the catalyst must meet certain economical requirements if it is to be used in a feasible commercial process. The catalyst should be one which is readily available, has a reasonable life, is not poisoned by any materials necessarily present in the reaction vessel and operable at a feasible temperature. In addition, the catalyst should preferably be capable of being readily reactivated. This latter is particularly important in a commercial operation.

It is, therefore, the object of the present invention to find a suitable process for the dehydrogenation of piperazine to pyrazine on a commercially feasible basis. It is also an object of the invention to find a catalyst suitable for use in that process. In general, the objects of the present invention are accomplished by dehydrogenation of the piperazine in the vapor phase.

In general, the process of the present invention may be carried out by vaporizing the piperazine and passing the resultant vapors over a satisfactory dehydrogenation catalyst. The rate of vapor flow and correspondingly the contact time with the catalyst may be regulated by the use of inert carrier gases. After being subjected to the catalytic reaction, the vapors are condensed, the pyrazine collected and any unreacted piperazine can be separated and recycled. In carrying out this process yields of up to about 45% can be obtained in a single pass through the catalytic zone. By recycling the unreacted piperazine a total conversion of better than 70% can be obtained, based on the amount of piperazine consumed.

The process will be more fully illustrated in connection with the accompanying chart showing the results obtained using two different catalysts.

While it is an advantage of the present invention that it is not limited to any particular apparatus or organization of apparatus, certain elements are found to be extremely useful in carrying out the process. For example, the piperazine should pass through the catalytic zone at a predetermined rate. Therefore some feed control means should be provided to perform this regulation. It is also more or less necessary to control the amount of diluent gas or vapor and thereby control the time of contact with the catalyst. These controls may be fairly simple. For example, a rate of flow indicator and a hand valve may be used. If so desired a more complicated system of automatic controls may be used.

While it is not absolutely essential to do so, for the best results the material should be fully vaporized before reaching the catalyst in order that a substantially uniform catalysis be obtained. In order to accomplish this it was found that the provision of a vaporizing chamber prior to the catalytic chamber was a practical solution. The piperazine or its hydrate may be fed directly to the chamber in which it may be vaporized, usually by heating. The resulting vapors may then be picked up by a stream of inert gas and carried into contact with the catalyst. Or, if so desired, the inert carrier gas and the piperazine may be mixed prior to being fed to the vaporizer. This latter procedure is preferable where the piperazine is fed to the apparatus in the form of a solution in a volatile solvent.

From the vaporizer the gas and vapor mixture is passed to a catalytic chamber in which the actual dehydrogenation takes place. The catalyst is usually contained in a tubular converter. From the catalytic chamber the mixed gases and vapors are passed to a condensing system in which the vapors are condensed and the fixed gases allowed to escape. This condensing system may be of any suitable type.

It was found well to provide a fractionating system in connection with the condenser so that the pyrazine may be separated from any unreacted piperazine, water or other liquids which may be condensed. This fractionator may be a part of the condensing system itself or the total condensate may be collected and fractionated in a subsequent operation. The latter operation is preferable where water is present during the reaction since pyrazine and water appear to form a constant boiling mixture and it is advantageous to dry the total condensate before fractionation. The drying may be readily carried out by using an absorbent such as pelleted sodium hydroxide, anhydrous sodium sulphate, calcium chloride or the like.

Either piperazine or piperazine hexahydrate may be used as a starting material in the present process. Each has certain recommendations. For example, in order to insure steady flow it is helpful to feed the material to the apparatus as a liquid. Since the hydrates melt much more readily than piperazine itself, they have an advantage in this respect and also in that they are more readily vaporized. On the other hand when a hydrated form is used as the raw material more water is present in the condensate with the resultant difficulty in purifying the pyrazine. Neither form possesses any particular advantage so far as the actual degree of dehydrogenation which can be finally achieved is concerned. In the present specification and the accompanying claims where piperazine is specified it is also meant to include a piperazine hydrate.

The practice of diluting the vapors being subjected to catalytic action in order to regulate the time of contact between vapor and catalyst or to depress undesirable side reactions has become more or less well known. In the present case any inert gas may be used. It was found that good results could be obtained using nitrogen or water vapor.

It was also found that it was feasible to regulate the feed of piperazine by diluting it. A satisfactory procedure was found to exist in making up a solution of piperazine in a volatile inert solvent and allowing the solvent vapors to replace all or a major portion of the diluent gas. Piperazine forms an approximately 4% solution in benzene at room temperature. This is substantially a saturated solution and was found to produce good results. Benzene did not interfere with the catalytic reaction. Other volatile solvents can be used if so desired, piperazine being soluble for example in such solvents as quinoline, toluene and xylene. However a saturated benzene solution produces good results and since this is an easy way to make up the solution benzene as a solvent was found to be preferable.

*Example*

A sample of piperazine was made into a saturated solution in thiophene-free benzene. Successive portions of this solution were vaporized and passed over a catalyst bed containing copper chromite supported on 4 to 8 mesh "Celite." In carrying out the reaction the rate of feed was measured in arbitrary units with a flowmeter. Total elapsed time and catalyst temperature were recorded and the rate of reaction was estimated by measuring the rate of gas evolution with a flowmeter and calculating the gas evolution as a percent of the theoretical hydrogen evolved. The catalyst temperature was varied in different runs from about 215° to about 500° C. The optimum temperature for best results was found to be between about 400 and 475° C. Conversions of piperazine to pyrazine of 35–45% were obtained in a single pass, thus indicating a total conversion of about 72% by recycling unconverted piperazine. The results obtained in one such run are shown on the chart as the curves A. The flowmeter used to measure the gas evolution rate was calibrated for pure hydrogen but since the gas actually measured involved not only hydrogen but also the diluent gas, solvent vapor and various by-products caused by the breakdown of pyrazine and piperazine the gas evolution rate expressed as a percent of the theoretical rate in many cases exceeded 100%. While this, therefore, did not give any absolute reading it was wholly adequate for comparative purposes.

Care must be taken to select a catalyst which does not favor undesirable side reactions such as the further breakdown of the pyrazine itself. This is shown by the fact that even in the more favorable circumstances the reaction products include a certain amount of ammonia and water. In addition to the care in selecting the catalyst attention should also be given to the necessity of operating at the optimum temperature range.

From the point of view of commercial practice the life of a catalyst and its susceptibility to reactivation are also important. In carrying out the development work on the present invention it was found that the copper chromite catalysts could be readily reactivated. That is, carbonaceous material deposited during the dehydrogenation process eventually reduces the activity of the catalyst. These tarry materials may be removed by passing air or oxygen-containing gas over the catalyst. This reactivation is followed by reduction where necessary. The temperature during reactivation must be limited so that the exothermic reactivation process does not result in permanent sintering of the surface. It was also found advisable to keep the catalysts in an atmosphere of hydrogen wherever possible from the time it was reactivated to the time it was ready to be used again.

I claim:

1. The method of producing pyrazine which comprises the steps of completely vaporizing piperazine, passing the vaporized material over a catalytic mass comprising copper chromite at a temperature from about 425–500° C., whereby piperazine is converted to pyrazine in the vapor phase, condensing the condensable portion of the reacted vapors and isolating pyrazine from the condensate.

2. A process according to claim 1 in which the catalytic mass comprises from about 2–15% by weight of copper chromite supported on an Activated Alumina, the dehydrogenation temperature being from about 425–500° C.

JAMES KENNETH DIXON.